UNITED STATES PATENT OFFICE.

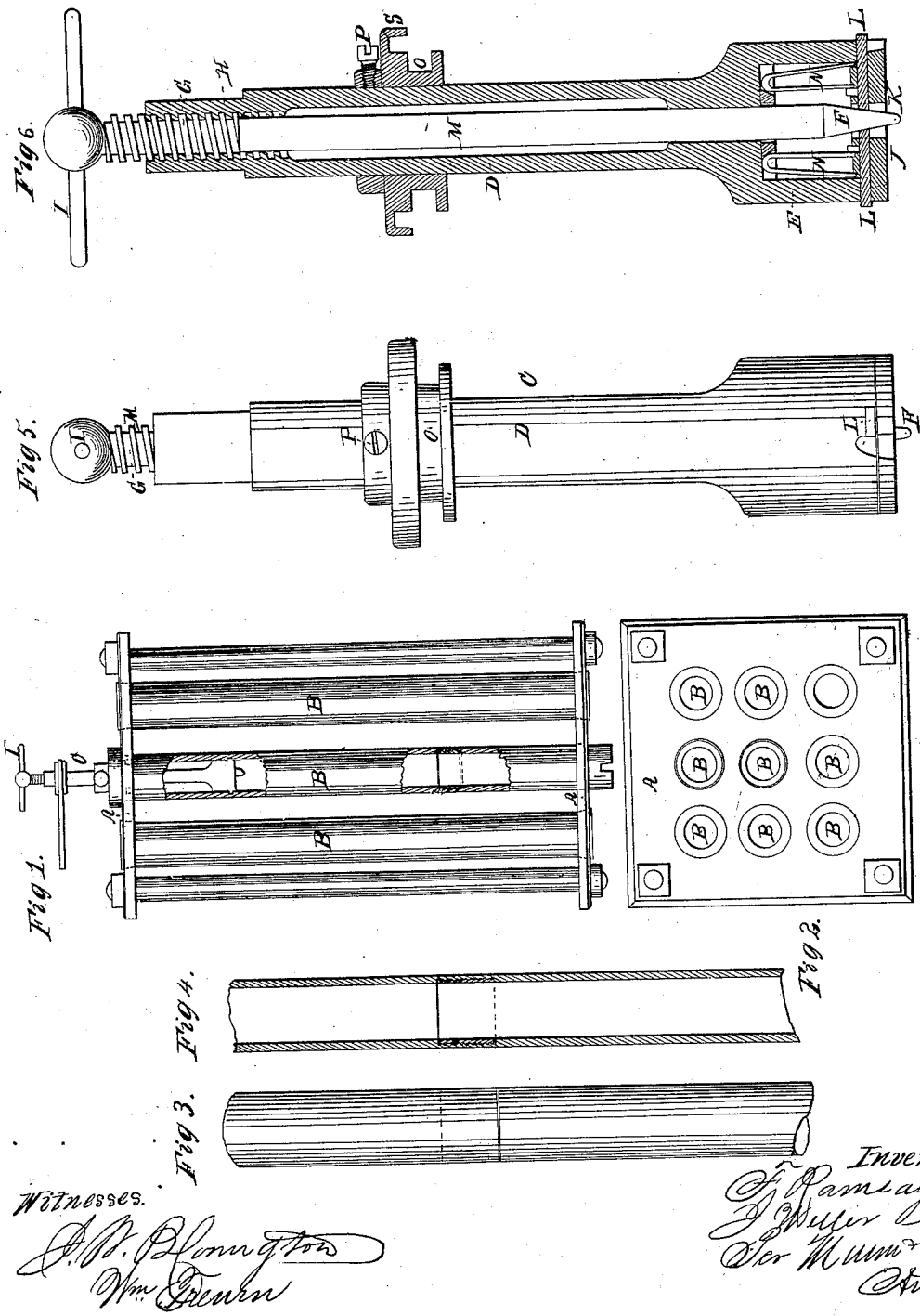

F. RAMSEY AND JAMES MILLER, OF NEW YORK, N. Y.

IMPROVED TOOL FOR CUTTING BOILER-TUBES.

Specification forming part of Letters Patent No. 58,886, dated October 16, 1866.

*To all whom it may concern:*

Be it known that we, F. RAMSEY and JAMES MILLER, of the city, county, and State of New York, have invented a new and Improved Tool for Cutting Boiler-Tubes; and we do hereby declare that the following is a full, clear, and exact description thereof, which will enable others skilled in the art to make and use the same, reference being had to the accompanying drawings, forming part of this specification.

Our invention consists in a tool for removing boiler-tubes, constructed, arranged, and applied as will be hereinafter more fully described, Figure 1 being a plan or top view of the same; Fig. 2, a view of one of the headplates or tube-sheets; Figs. 3 and 4, respectively, an exterior view of a boiler-tube on an enlarged scale from that shown in Figs. 1 and 2 and a central section taken in the direction of the length of the said tube; Fig. 5, an outside view of the tool in the direction of its length for cutting the boiler-tubes upon the inside; and Fig. 6, a central section of the tool shown in Fig. 5, taken in the direction of its length.

Similar letters of reference indicate like parts.

A A in the drawings represent the two tube-sheets or head-plates of the boiler, having a series of parallel tubes, B B, inserted and secured in the same, the construction of the boiler being similar to that now commonly practiced, and therefore needing no particular description herein. C is a tool consisting of a long hollow tube or shank, D, somewhat enlarged at one end, E, in and through the center of which tube in the direction of its length extends a spindle or shaft, M, made of a conical or tapering shape at one end, F, and at its other provided with a screw portion, H, of one end of the hollow shank D, the spindle at its screw-threaded end being provided with a handle, I, for convenience in turning it. The enlarged end E of the shank D is closed by a cap or end plate, J, secured to it by screws, or in any other proper manner, with an opening, K, through its center.

L L are two cutters, arranged in suitable ways or guides of the cap-plate J in radial lines with its center, and in the same line with each other, the inner end of these cutters L bearing against the conical or tapering shaped end F of the shaft M, against which they are held by bent springs N, properly arranged therefor within the interior of the enlarged end E.

By this arrangement and construction of the tool C, as above explained, it is plain to be seen that according as the spindle M is screwed either in or out the cutters at its enlarged end will be either moved outward, and thus made to project more or less from the periphery of the same by the action of the conical or tapering shaped end of the spindle, or drawn inward as the conical end of the spindle moves in by the bent spring N, connected with such cutters, and arranged, as before explained.

O is a collar secured by set-screw P to the shank D of tool C, the object of which collar will be presently explained.

The purpose for which the tool above described is designed is to cut or sever the boiler-tubes from their inside; and when used for such purpose its enlarged end is inserted in the end of the boiler-tube which is to be cut a sufficient distance to bring the cutters of such tool opposite to the point of the tube where it is desired to cut or sever it, the flange S of the adjustable collar O of the tool being then set against the outer end of the tube, when, the tool being revolved in any proper manner through a pulley and connecting-belt or other suitable means, at the same time the cutters gradually forced out of the tool by turning the screw-shaft in the proper direction therefor, the cutters are caused to act against the inside of the tube, cutting or severing it at such point, after which the tool is withdrawn from the tube, first having, however, drawn in its cutters by turning the screw-shaft in the proper direction therefor. Having thus cut or severed the boiler-tube at a point between its tube-sheets or head-plates, either one or the other of its two sections can be then removed from the boiler without disturbing its other section, the part removed depending of course upon which tube-sheet of the boiler is to be cleansed or scraped, which having been accomplished the section of the tube so removed can be replaced with a suitable section or length of tube, screwed or otherwise properly jointed, with the open end of the tube-section within the boiler, and not removed therefrom, when the outer end of such inserted tube is riveted to the head-plate or tube-sheet in the ordinary manner, the tube thus jointed being as firm and strong as if of one continuous piece.

Having thus described our invention, what we claim as new, and desire to secure by Letters Patent, is—

1. The combination of the shank D, screw-shaft M, with tapering end F, cap J, cutters L L, and spring N N, constructed and operating substantially as described, for the purpose specified.

2. The flanged adjustable collar O, in combination with the shank D, substantially as and for the purpose specified.

The above specification of our invention signed by us this 7th day of March, 1866.

F. RAMSEY.
JAMES MILLER.

Witnesses:
ALBERT W. BROWN,
M. M. LIVINGSTON.